R. E. HOUSE.
CALIPERS FOR MEASURING TELEGRAPHIC SYMBOLS.
No. 180,095.             Patented July 25, 1876.
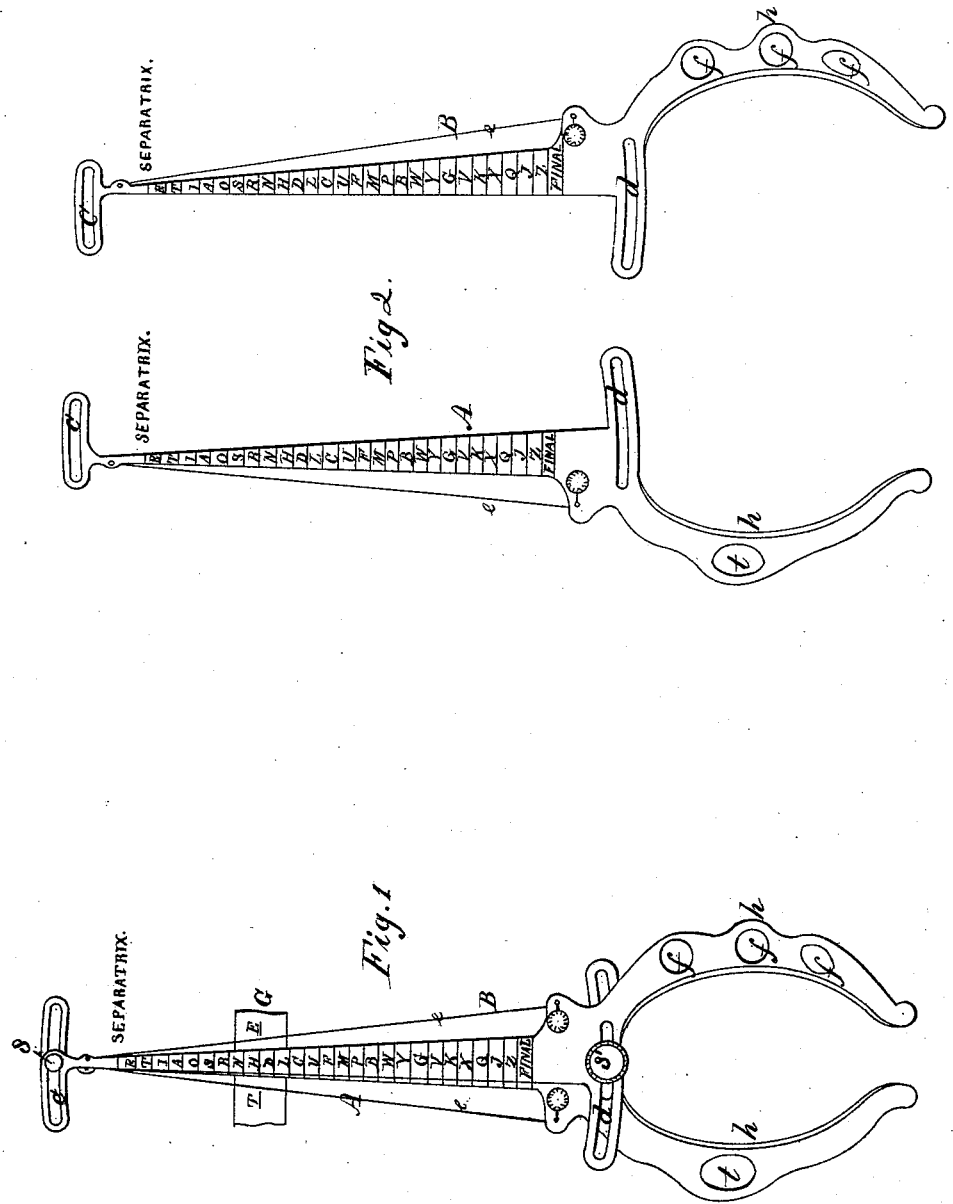

UNITED STATES PATENT OFFICE.

ROYAL E. HOUSE, OF BINGHAMTON, NEW YORK.

IMPROVEMENT IN CALIPERS FOR MEASURING TELEGRAPHIC SYMBOLS.

Specification forming part of Letters Patent No. 180,095, dated July 25, 1876; application filed July 1, 1876.

*To all whom it may concern:*

Be it known that I, ROYAL E. HOUSE, of Binghamton, in the county of Broome and State of New York, have invented an Improved Instrument for Determining the Character of Telegraphic Letter-Symbols; and I do hereby declare the following to be a full, clear, and exact description of the same, reference being had to the accompanying drawings, forming part of this specification, in which—

Figure 1 is a plan of the instrument, and Fig. 2 represents the two parts of the instrument detached.

Similar letters of reference in the accompanying drawings denote the same parts.

This application is a division of a former application filed by me in the United States Patent Office June 17, 1870.

In the improved system of telegraphing which I have invented, and which forms the subject of other applications for Letters Patent, I employ a code or alphabet of letter-symbols, in which each letter is designated by a mark or space differing in length from the marks or spaces that represent the other letters, the shortest symbol being the "separatrix," that intervenes between the words of a dispatch, the longest symbol being the "final," that denotes the end of the dispatch, and the other symbols, from shortest to longest, representing the letters of the alphabet in the following order, viz: $e\ t\ i\ a\ o\ s\ r\ n\ h\ d\ l\ c\ u\ f\ m\ p\ b\ w\ y\ g\ v\ k\ x\ q\ j\ z$. Inasmuch as the symbol which represents any one letter in this arrangement differs but slightly from the symbols which represent the proximate letters, it may at times be difficult for an operator to determine by the eye alone what letter a given symbol represents.

The object of my present invention is to meet this difficulty by providing for the use of telegraphic operators a simple and convenient instrument for determining the letter instantly and without error; and to this end the principle of the invention consists, in general terms, in an instrument adapted to measure the length of the letter-symbols, combined with an indicator adapted to indicate at a glance the precise letter denoted by any symbol that is measured, the two essential elements being a symbol-measurer and a letter-indicator, adapted to operate accurately and automatically therewith.

As the standard length of the letter-symbols of one telegraph-line will frequently differ from the standard length adopted by other lines, or the telegraph apparatus at different stations may vary somewhat in operation, the instrument should be so constructed that it can be adjusted to measure and indicate with equal quickness and accuracy, whatever standard symbol-length may be adopted, or however the telegraph-instruments may vary from each other in rapidity of operation.

Having thus stated the general principle of the invention, which may be reduced to practice in a great variety of ways, not necessary here to be enumerated or described, I will proceed to set forth the construction and operation of that form of instrument which I have, by practical experiment for a long time, determined to be best adapted to the purpose.

This instrument consists of two counterparts, A B, (represented in Fig. 2,) made of sheet-steel or other suitable material, connected together by one or more clamping-screws, $s\ s'$, which operate in curved slots $c\ d$, as shown in Fig. 1, each counterpart having a suitable handle, $h$, provided with a thumb-hole, $t$, or finger-holes $f f$, for convenience in grasping and handling the instrument. Between the slots $c\ d$ the two plates are sufficiently elongated to furnish a suitable tablet, upon which all the letters and other symbols can be laid off in transverse lines in regular order, as shown. Threads or hair-lines $e\ e$ may extend from one end to the other of each tablet, being held by binding-screws or other suitable means.

The operation of this improved instrument will be readily understood. If the telegraph-operator is in doubt as to the character of any symbol made upon his receiving-instrument, as, for example, the middle symbol of the strip G, (shown in Fig. 1,) he has only to apply the measuring-instrument to the fillet and slide it along until its tapering edge at one side coincides with the end of the letter T, while the tapering edge of the other side coincides with the beginning of the letter E, when the width of the instrument at that point will exactly coincide with the distance between the two letters T and E, and the mark on the body of the instrument will at once indicate that such width answers to the letter H. The hair-lines constitute the tapering edges here referred to, but are used merely for greater accuracy and convenience, and may be dispensed with and the edges of the plates employed in their place, if preferred, and either the outside or inside edges of the plates A B may be employed with the proper adaptation of the other parts.

The taper of the instrument is adjusted by means of the clamping-screws $s$ $s'$, so as to correspond to the regular series of letter-symbols employed on the line, or made by the particular receiving-instrument with which it is to be used. This is readily ascertained by experiment, and, when once adapted to any receiving-instrument, will require no subsequent change unless the standard is changed. I prefer to employ a variable taper with an invariable indicator, as described; but the same result may be approximated by an instrument having an invariable taper with a variable indicator, and I regard the two forms of device as practical equivalents, and as coming equally within the limits of my invention.

I claim as new—

1. A measuring-instrument adapted to measure the length of telegraphic letter-symbols, and having an indicating device which automatically indicates to the eye the precise letter denoted by any symbol that is measured.

2. A tapering blade having its taper adjustable, combined with an indicating device which indicates to the eye the letters of the alphabet corresponding to telegraphic symbols, which coincide in length with the width of the blade at different points, substantially as described.

3. In a combined measuring and indicating instrument for telegraphic purposes, as described, the combination of two pivoted plates, A B, capable of being clamped immovably together, so that their edges can be adjusted to any taper, as may be required.

4. The combination of the hair-lines $e$ $e$ with the pivoted plates A B, capable of being adjusted and clamped, substantially as described.

5. The tapering plates A B, adjustably connected together by clamping-screws $s$ $s'$ at both ends, and having the part between the screws graduated and provided with indicating-marks, as and for the purposes set forth.

ROYAL E. HOUSE.

Witnesses:
E. A. ELLSWORTH,
L. HILL.